Dec. 7, 1965  J. W. NOBLE  3,221,746

SURGICAL CONNECTING DEVICE

Filed Jan. 25, 1963

INVENTOR.
JOHN WILLIAM NOBLE.
BY
Hubert E. Evans
his ATTORNEY

United States Patent Office 3,221,746
Patented Dec. 7, 1965

3,221,746
SURGICAL CONNECTING DEVICE
John William Noble, 5747 Union Ave. NE.,
Alliance, Ohio
Filed Jan. 25, 1963, Ser. No. 253,890
3 Claims. (Cl. 128—334)

This invention relates to a surgical device useful for connecting severed ends of tubular canal members of the body. It is believed to be particularly suited for reconnecting severed ends of blood vessels and for providing a replacement for damaged portions of blood vessels.

When by accident, or illness, or surgery, it is necessary to sever a number of such tubular canal members, it is highly desirable to effect reconnection thereof as swiftly as possible to reduce shock and other undesirable effects on the health of the patient.

It is therefore an object of the present invention to provide a device whereby the reconnection of severed tubular canal members may be accomplished much more quickly than has been previously possible.

Another object is to provide a device that will effect a secure joining of the severed tubular members which will be permanent in nature.

Another object is to provide a surgical connecting device which is compatible with the body tissues coming into contact with it and acceptable to the fluids passing through the canal members and the device itself after a repair has been effected.

It is also an object of this invention to provide a connecting device which is simple in design and construction, easy to use, and which will not interfere with the normal use or operation of the affected tubular members being repaired.

Other objects and advantages will be apparent from the following detailed description of a preferred embodiment of the invention, illustrated in the accompanying drawings, in which.

Figure 1:
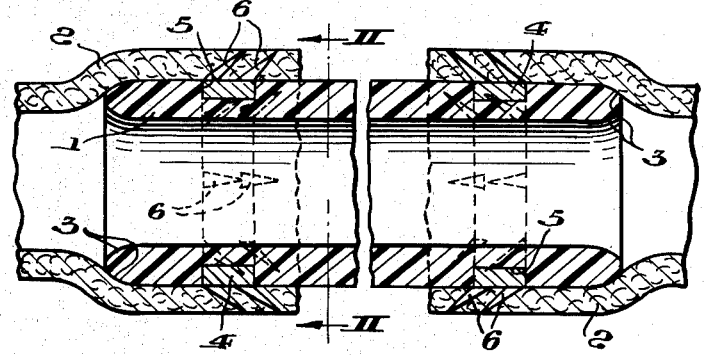
FIGURE 1 represents a greatly enlarged longitudinal sectional view of the device in use.
Figure 2:
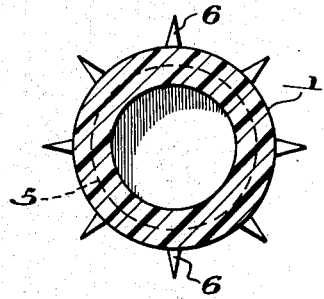
FIG. 2 is a section taken on line II—II of FIG. 1.

In the form of the invention shown in FIGS. 1 and 2 the surgical connecting device is illustrated as a body 1 comprising a portion or section of tubing. When used to reconnect severed ends of a tubular canal, such as a blood vessel 2, the device may be relatively short. The device is shown as broken in FIG. 1 to emphasize that it may be made in varying lengths, as may be appropriate. When a portion of a damaged blood vessel is to be replaced, a synthetic blood vessel is cut to the desired length and two of the connecting devices are used to secure the replacement portion to the ends of the blood vessel, thus providing a neat repair which may be quickly effected. It may thus be seen that the connecting device need only be as long as a doctor can handle readily and conveniently.

Preferably, the tubing walls of the body 1 are rounded or beveled as indicated at 3. The end of the outside wall of the tubing section is tapered to facilitate insertion into the tubular canal it is to connect, and the end of the inside wall is tapered to minimize interference with the flow of fluid, for example, blood, through the connecting device when it is in use.

The body of the device may be made of a number of materials. It should be flexible to accommodate itself to the required position, either straight or curved, depending upon its location of use. It should also be resilient to resist crushing forces and to spring back to its tubular condition and act as a conduit for the fluid flowing through the canal member 2. It is desirable that the body 1 be made of a material that is both inert and acceptable to the body tissues it contacts, and in addition it should be acceptable to the fluid, e.g. blood, passing through the canal member 2 and the tubular body 1. Some materials have the property of reacting with the blood, either chemically or electrically, creating undesirable effects and it is better that such materials not be used in the tubular body 1. An especially good material for use in the present invention is tubing made of a fluorocarbon resin, sold under the trademark "Teflon." When made into thin walled tubing it is flexible, resilient, and is compatible with and acceptable to body tissues as well as blood. So far as is known it will remain inert and unaffected, or substantially so, when in contact with body tissues and fluids over long time periods.

Adjacent each of the ends of the tubular body 1, means for gripping and securing the ends of the blood vessels 2 are provided. These means may be in the form of rings 4 disposed around the periphery of the tubular body 1, and to be sure the ring members 4 are securely mounted, they may be located in annular grooves 5 formed in the tubular body 1. Each of the rings 4 may be provided with a plurality of barbs or sharpened portions 6 having their pointed ends directed inwardly of the ends of and outwardly from the periphery of the tubular body 1. In the form of the invention shown in FIGS. 1 and 2, each ring 4 has two series of barbs 6 arranged at spaced intervals around the cylindrical outer surface of the ring. These barbs 6 provide means for securely gripping the ends of the tubular canals or blood vessels 2.

The rings 4 and barbs 6 are preferably integral and may be fabricated from a metal which is compatible with body tissue. Surgical stainless steel is desirable but other metals or alloys, including silver and tantalum, or even non-metallic materials may be used.

Figure 3:
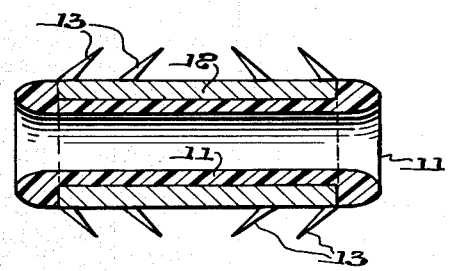
FIG. 3 is an enlarged cross sectional view of a modified form of the device.

FIG. 3 shows a modified form of the invention with a tubular body 11, and a single annular member 12 mounted thereon having a plurality of series of barbs or sharpened points 13 arranged at spaced intervals around the outer cylindrical surface of the tubular body 11. In this form, two series of barbs are disposed adjacent each end of the tubular body and have sharpened points directed inwardly of such ends and outwardly of the outer wall of the tubular body 11. When the ends of a severed blood vessel are slid onto each end of the tubular body, passing over the barbs, the ends of the blood vessel are securely engaged and reconnected by the central opening of the tubular body so that fluid may flow therethrough. It will be noted that the fluid contacts only the tubular body and if this is made of a suitable non-conductive plastic material, adverse chemical or electrical reactions are thus avoided.

While the present invention has been described for use in connecting tubular blood canals, such as arteries and veins, it will be apparent that the device may be advantageously employed for the repair or partial replacement of other tubular canal elements of the body (i.e. intestines, esophagus, etc.).

In the case of accidents or injuries which involve severance of a number of blood vessels or the like, the device may be used to great advantage in repairing and reconnecting such vessels in a much shorter time than heretofore, thereby reducing shock to the system of the human or animal and improving the chances for speedy and complete recovery.

Changes in the form and positioning of the elements making up the device embodying the present invention may be varied by those skilled in the art without departing from the spirit of the present invention.

What I claim is:

1. A device for connecting tubular canal members, such as blood vessels, of the human or animal body which comprises a section of flexible and resilient tubing having first and second rounded ends for insertion into said canal members, said tubing further having at least one groove extending circumferentially of said tubing and intermediate the said ends thereof, annular gripping means of substantially rigid material compatible with body tissue anchored in said circumferential groove, said gripping means including two sets of gripping barbs, one set of said barbs being anchored adjacent said first end of said tubing and the other set being anchored adjacent said second tubing end, said barbs extending outwardly from said gripping means and being angularly directed away from their respective tubing ends so that said tubular canal means are held in coaptation when said device is properly positioned therein.

2. A device for connecting tubular canal members, such as blood vessels, of the human or animal body which comprises a section of flexible and resilient tubing having first and second rounded ends for insertion into said canal members, said tubing further having grooves extending circumferentially of said tubing and adjacent each of said first and second rounded ends, annular gripping means of substantially rigid material compatible with body tissue mounted in said external grooves, said gripping means each including one set of gripping barbs, said set of barbs extending outwardly from said gripping means and being angularly directed away from their respective tubing ends so that said tubular canal means are held in coaptation when said device is properly positioned therein.

3. A device for connecting tubular canal members, such as blood vessels, of the human or animal body which comprises a section of flexible and resilient tubing having first and second rounded ends for insertion into said canal members, said tubing also having one wide groove extending circumferentially of said tubing from near said first end to near said second end, annular gripping means of substantially rigid material compatible with body tissue anchored in said wide circumferential groove, said gripping means including two sets of barbs, one set being anchored adjacent said first end of said tubing and the other set being anchored adjacent said second end of said tubing, said barbs extending outwardly from said gripping means and being angularly directed away from their respective tubing ends whereby said canal members are connected end to end when said device is properly positioned therein.

References Cited by the Examiner

UNITED STATES PATENTS

| | | | |
|---|---|---|---|
| 567,962 | 9/1896 | Cooper | 285—239 |
| 589,216 | 8/1897 | McKee | 285—239 |
| 1,151,300 | 8/1915 | Soresi | 128—214 |
| 1,470,707 | 10/1923 | Bates | 128—334 |
| 2,453,056 | 11/1948 | Zack | 128—334 |

FOREIGN PATENTS

| | | |
|---|---|---|
| 137,839 | 4/1960 | U.S.S.R. |
| 1,216,808 | 11/1959 | France. |

OTHER REFERENCES

Edwards et al.: "An Improved Crimped Graft of Teflon," from Surgery, vol. 45, No. 2, February 1959, pp. 298–309.

RICHARD A. GAUDET, *Primary Examiner.*

JORDAN FRANKLIN, *Examiner.*